(12) United States Patent
Kaminsky et al.

(10) Patent No.: US 8,312,446 B2
(45) Date of Patent: Nov. 13, 2012

(54) DEPENDENCY MANAGEMENT WHEN UPGRADING APPLICATION COMPONENTS

(75) Inventors: David Louis Kaminsky, Chapel Hill, NC (US); David M. Ogle, Cary, NC (US); Richard Dean Telford, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 3094 days.

(21) Appl. No.: 10/321,356

(22) Filed: Dec. 17, 2002

(65) Prior Publication Data
US 2004/0117783 A1 Jun. 17, 2004

(51) Int. Cl.
*G06F 9/445* (2006.01)
*G06F 9/44* (2006.01)
*G06F 17/00* (2006.01)
*G06F 15/173* (2006.01)

(52) U.S. Cl. ........ 717/175; 717/169; 717/170; 717/174; 715/235; 715/237; 709/223

(58) Field of Classification Search .......... 717/168–173, 717/174–178; 715/235, 237; 709/223, 209; 703/20; 707/106.1
See application file for complete search history.

(56) References Cited

U.S. PATENT DOCUMENTS

| | | | |
|---|---|---|---|
| 5,450,567 A * | 9/1995 | Mori et al. ...................... | 703/20 |
| 5,664,194 A * | 9/1997 | Paulsen .......................... | 717/178 |
| 5,761,649 A * | 6/1998 | Hill ................................ | 705/27 |
| 5,771,386 A * | 6/1998 | Baumbauer .................... | 717/164 |
| 6,094,659 A * | 7/2000 | Bhatia ........................... | 707/104.1 |
| 6,131,088 A * | 10/2000 | Hill ................................ | 705/27 |
| 6,202,207 B1 * | 3/2001 | Donohue ........................ | 717/173 |
| 6,289,511 B1 * | 9/2001 | Hubinette ....................... | 717/173 |
| 6,484,315 B1 * | 11/2002 | Ziese ............................. | 717/173 |
| 6,606,744 B1 * | 8/2003 | Mikurak ........................ | 717/174 |
| 6,732,358 B1 * | 5/2004 | Siefert ........................... | 717/173 |
| 6,871,198 B2 * | 3/2005 | Neal et al. ..................... | 707/3 |
| 6,889,248 B1 * | 5/2005 | Scheer ........................... | 709/209 |

OTHER PUBLICATIONS

David Fischer, ebxml-cppa message, Jan. 11, 2002, http://www.oasis-open.org/archives/ebxml-cppa/20001/msg00058.html.*
Eclipse Platform Update Packaging Conventions, <http://dev.eclipse.org/viewcvs/index.cgi...e-home/doc/eclipse_update_packaging.html>, pp. 1-18, (Oct. 10, 2002).

* cited by examiner

*Primary Examiner* — Hoang-Vu A Nguyen-Ba
(74) *Attorney, Agent, or Firm* — Steven M. Greenberg, Esq.; Carey, Rodriguez, Greenberg & O'Keefe

(57) ABSTRACT

An autonomic component installation system. The system can include a catalog of host components installed within a computing system and an autonomic installer coupled to the catalog and programmed to determine, when installing an upgraded component, whether the upgraded component provides component capabilities required by the host components in the catalog. The catalog can include both host components and respective publicly accessible data, method implementations and method prototypes provided by the host components. Consequently, the autonomic installer can determine whether the upgraded component will have access to required publicly accessible data and method implementations. The autonomic installer further can be configured to determine whether modifications included in the upgraded component have caused changes in associated method prototypes which differ from the method prototypes in the catalog. Finally, a machine-readable ReadMe file processor can be coupled to the autonomic installer to identify the required publicly accessible data and methods implementations.

18 Claims, 3 Drawing Sheets

DEPENDENCY MANAGEMENT WHEN UPGRADING APPLICATION COMPONENTS

BACKGROUND OF THE INVENTION

1. Statement of the Technical Field

The present invention relates to the field of application component installation, and more particularly to dependency management during the installation of upgraded application components.

2. Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

In the context of an application installation meant to upgrade the components of an application, oftentimes, simply replacing application out-dated versions of application components with newer versions of components will not alone suffice as a complete application upgrade. Rather, in an era of code re-use, shared libraries, and interdependent program objects, replacing a single application component can have a dramatic effect upon other separate, but independent applications. Common disastrous consequences include altered and now incompatible application programming interfaces (APIs), re-positioned application objects, and removed application objects. In all cases, an application dependency can be broken simply by upgrading the application components of another, unrelated application.

Whereas application component upgrades can be problematic generally, in an autonomic system, the problem can be particularly acute. For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

Thus, in keeping with the principles of autonomic computing, an upgrade to application componentry must not only account for the seamless installation and configuration of the upgraded application, but also the impact of the upgrade upon dependencies must be considered. Specifically, it will be of paramount concern to the autonomic system that dependent applications are not "broken" in consequence of changing APIs, moved application elements, modified application elements, and removed application elements.

Presently, several application upgrade strategies exist. One such well-known strategy includes the venerable "ReadMe" file. In this strategy, software developers provide a list, typically as standard prose, of components in the upgraded application which have changed, along with a characterization of how the components have changed. Subsequently, during installation, an application administrator can peruse the contents of the list to determine the level of exposure faced by dependencies in view of the proposed application upgrade. As it will be recognized by one skilled in the art, however, the creation and use of a conventional ReadMe file can be both tedious and unreliable.

It will also be well understood by those skilled artisans that automated methods exist at least to remediate the tedium associated with the conventional ReadMe file. Specifically, various programming tools have been developed through which application component dependencies can be identified among system elements. Prior to any installation effort, the programming tool can be executed so as to determine the risk of undertaking the application upgrade. Still, this process lacks the granularity necessary to definitively determine what components may have changed in consequence of an upgrade. As a result, the analysis can consume substantial processing resources without producing the analysis necessary to truly identify the upgrade risk to specific dependencies.

SUMMARY OF THE INVENTION

The present invention is an autonomic component installation system which overcomes the deficiencies inherent to conventional application component installation systems and methods and provides a novel and non-obvious method and system for undertaking dependency management when installing an upgraded component in a system of components. In a preferred aspect of the present invention, an autonomic component installation system can include catalog of host components installed within a computing system and an autonomic installer coupled to the catalog and programmed to determine, when installing an upgraded component, whether the upgraded component provides component capabilities required by the host components in the catalog.

The catalog can include both a catalog of host components and respective publicly accessible data, method implementations and method prototypes provided by the host components. In this regard, the autonomic installer can determine whether the upgraded component will have access to required ones of the publicly accessible data and method implementations. The autonomic installer further can be configured to determine whether modifications included in the upgraded component have caused changes in associated method prototypes which differ from the method prototypes in the catalog. Finally, a machine readable ReadMe file processor can be coupled to the autonomic installer and configured to identify the required ones of said publicly accessible data and methods implementations. Notably, the machine readable ReadMe file can be an XML formatted file.

In the preferred aspect of the present invention, a code analysis engine can be configured to identify within component code, publicly accessible data utilized by the component code, dependent methods utilized by the component code, and methods and data provided by the component code. Additionally, a machine readable ReadMe file production module can be coupled both to the code analysis engine and also to an integrated development environment configured to create said upgraded component. In this regard, the production module can create the machine readable ReadMe file based upon the identified publicly accessible data utilized by the component code, dependent methods utilized by the component code, and methods and data provided by the component code.

A dependency management method can include parsing a machine readable ReadMe file associated with an upgraded component to an application to identify both data and method dependencies of the upgraded component, and interface prototype information regarding methods implemented in the upgraded component. Prior to installing the upgraded component, it can be ensured that the identified data and method dependencies can be accessed by the upgraded component upon installation of the upgraded component. Moreover, it can be ensured that other components which rely upon the methods implemented in the upgraded component will not be affected by the installation in consequence of changes reflected by the interface prototype information.

In this regard, the step of ensuring can include determining that at least one of the identified data and method dependencies are missing; and, locating and loading the identified data and method dependency so that no one of the identified data and method dependencies remain missing. Also, the step of ensuring can include the step of further ensuring by reference to a catalog of expected interface prototype information that other components which rely upon the methods implemented in the upgraded component will not be affected by the installation in consequence of changes reflected by the interface prototype information. Importantly, during the ensuring process, the catalog of expected interface prototype information can be compared with other components which rely upon the methods implemented in the upgraded component to detect prototype mismatches. For each prototype mismatch detected, an upgrade to a corresponding one of the other components can be located. Subsequently, the corresponding one of the other components can be replaced with the located upgrade.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for managing application component dependencies when upgrading application components in an autonomic system. Specifically, a machine readable ReadMe file can be created in which dependencies associated with upgrade information regarding an upgrade installation of an application can be listed. The upgrade information can include a listing of system components which have changed, new dependencies created by the system components, altered APIs and the like. In a preferred aspect of the present invention, the listings within machine readable ReadMe file can be formatted with markup language tags such as XML tags so as to facilitate the portability of the machine readable ReadMe file.

When an autonomic system prepares to upgrade one or more application components, first the autonomic system can read the machine readable ReadMe file to determine which dependencies are required by the application component or components. Notably, where no relevant dependencies can be identified, the upgrade can proceed. By comparison, where relevant dependencies can be identified, the dependencies can be located and installed. Importantly, the dependency identification process can be repeated recursively for each located dependency so as to ensure the operability of all dependencies.

Once, all dependencies have been located and installed as necessary, the autonomic system can determine from the machine readable ReadMe file which other application components are likely to be impacted by the upgrade. In particular, changes to the API of the upgraded application component or components can be considered in this regard. If the autonomic system detects an API mismatch, the autonomic system can attempt to locate a suitable update for the dependency relying upon the outdated API. In one embodiment, the system can maintain a list of Web sites that contain components available for loading. The system can consult the sites in the list until the suitable component is found, or until all sites are determined not to have a suitable component. In the case where mismatches exist and no suitable updates for the dependencies can be located, a failure record can be delivered to the systems administrator.

Notably, the machine readable ReadMe files can be generated programmatically. More particularly, in a preferred aspect of the invention, the machine readable ReadMe files can be generated through a tool associated with or incorporated within an application component development environment. Through versioning functionality ordinarily included as part of the development environment, it can be determined whether a particular function or data member of an application component has changed, or where the function or data member simply has been relocated within a composition of application components, or whether the changes to a function member will not affect dependencies through a mere change in implementation rather than interface.

Figure 1:
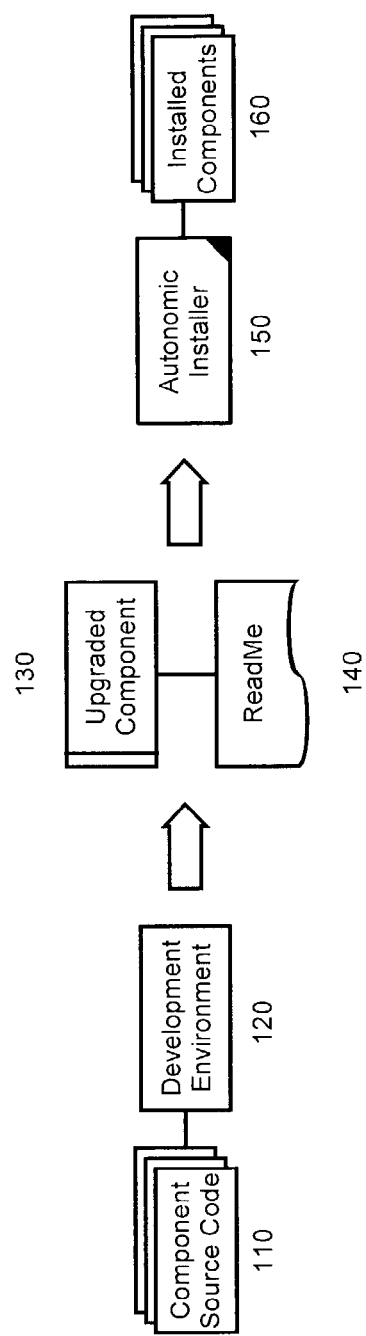
FIG. 1 is a schematic illustration of a dependency management system which has been configured in accordance with the inventive arrangements.

FIG. 1 is a schematic illustration of a dependency management system which has been configured in accordance with the inventive arrangements. As shown in FIG. 1, the dependency management system can include a development environment 120 in which application components can be created and modified. The development environment 120 can be an integrated development environment such as the Eclipse™ platform manufactured by International Business Machines Corporation of Armonk, New York, United States. Within the development environment 120, application components can be created anew or enhanced as the case may be. In particular, one or both of the data members and method members of source code 110 of the application components can be modified in the creation of an upgraded component or components 130.

Notably, whereas the development environment 120 can manage the entirety of an application formed from many independent and interdependent application components, the development environment 120 can track those application components which are dependent upon both the publicly accessible data members of the upgraded component or components 130, and also the publicly accessible method members of the upgraded component or components 130. In this way, once the upgraded component or components 130 of the application have been completed, the development environment 120 can produce a machine readable ReadMe file 140 into which the development environment 120 can record the identity of those application components which have changed, any new dependencies which have been created by virtue of the changed component or components 130, and any alterations to the API by virtue of the changed component or components 130.

Subsequently, as an autonomic installation process 150 prepares to install the application, including the upgraded application component or components 130, the autonomic installation process 150 first can review the contents of the machine readable ReadMe file 140 to identify those dependencies which are required by each component, and also the impact which the upgraded component or components 130 may have upon other components in the application—particularly by way of any modifications to the application API. Notably, where the machine readable ReadMe file 140 has been formatted according to an XML document type definition for machine readable ReadMe files, the machine readable ReadMe file while have associated therewith a level of portability in consequence of which the machine readable ReadMe file can be processed by any autonomic installation process, regardless of internal protocol.

Importantly, initially the autonomic installation process 150 can determine from the machine readable ReadMe file 140 those dependencies which will be required for the proper operation of the upgraded application including the upgraded component or components 130. If the autonomic installation process 150 determines that all dependencies can be satisfied, then the installation process can proceed without delay. Otherwise, the autonomic installation process 150 can attempt to locate and load all objects hosting the necessary dependencies. If the autonomic installation process 150 cannot locate one or more of the required dependencies, the installation can terminate gracefully.

Once the required dependencies of the upgraded application have been satisfied, next the autonomic installation process can determine from the machine readable ReadMe file 140 whether any of the application API has changed so as to "break" a dependent application component. In the event that a mismatch has been detected between the form of the API expected by the dependent application component and the new form of the API, an upgrade to the dependent application can be located which might demonstrate better compatibility with the new form of the API. If an upgrade can be located, the autonomic installation process 150 can proceed to process the installed components 160. Otherwise, if an upgrade cannot be located, again the installation can terminate gracefully.

Notably, the dependency management process illustrated herein can be applied not merely to a single instance of an upgraded application component, but also to each dependency which the autonomic installation process 150 must itself install to satisfy the dependency requirements of the upgraded application component or components 130. In this way, throughout the chain of dependencies, it can be ensured that all installed components neither have been broken by the upgrades of other application components, nor lack any required dependencies for the suitable operation of the installed components.

Figure 2:
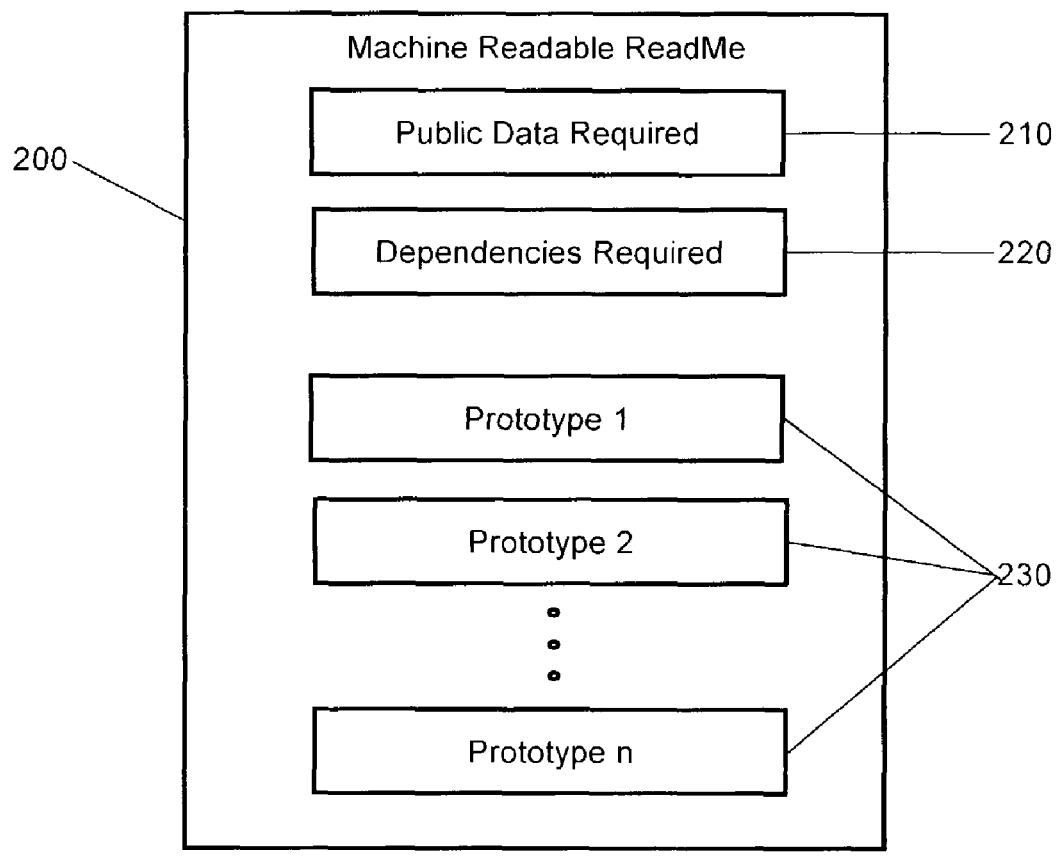
FIG. 2 is a block diagram illustrating the structure of the machine readable ReadMe file of FIG. 1; and, FIG. 3 is a flow chart illustrating a dependency management process for use in the system of FIG. 1.

FIG. 2 is a block diagram illustrating the structure of the machine readable ReadMe file of FIG. 1. In a preferred aspect of the present invention, a machine readable ReadMe file 200 can include a listing of public data required by an associated application. To identify public data required by the application, the byte code or the source code of the individual components of the application can be inspected for references to publicly accessible data. Where a method within a component references a public data member, it can be presumed that the public data must remain available regardless of an application upgrade for the application to function properly.

The machine readable ReadMe file 200 also can include a listing of dependencies 220 required by the application so as to function properly. Again, as in the case of the public data, to identify public data required by the application, the byte code or the source code of the individual components can be inspected for references to methods within other components. Where a method within a component references a method of another component, it can be presumed that the upgraded application component is dependent upon the component hosting the identified method.

Finally, the machine readable ReadMe file 200 can include a listing of method prototypes 230 implemented within the upgraded application component or components. Notably, by cataloging those method prototypes 230 implemented within the upgraded application component or components, a catalog can be developed for all application components which specifies not only those methods defined within a system, but also the source of those methods and their respective prototypes. Accordingly, where the prototype (e.g. interface) of any one method changes by way of an application upgrade, a review of the catalog will reveal the change to the system API.

Figure 3:
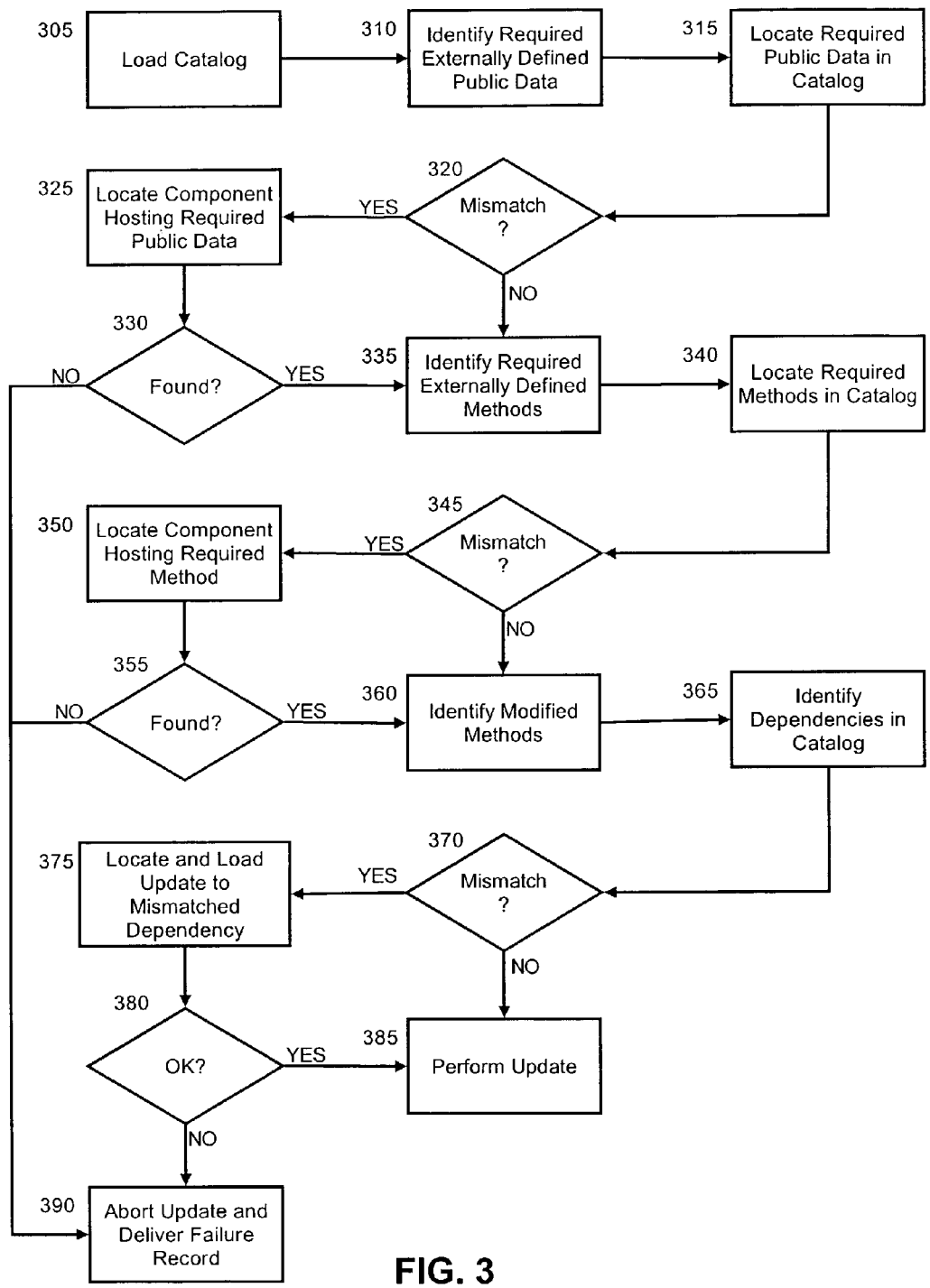

FIG. 3 is a flow chart illustrating a dependency management process for use in the system of FIG. 1. Specifically, the dependency management process can be used when installing an upgraded application component or components. Beginning in block 305, a catalog of publicly accessible data, methods and prototype dependencies can be loaded. In block 310, the machine readable ReadMe file can be reviewed to identify externally defined public data which will be required by the upgraded application component or components. In block 315, the catalog can be consulted to ensure that the required public data will be available to the upgraded application component or components.

In decision block 320, if a mismatch is not identified (meaning that the required public data will be available to the upgraded application component or components), the installation process can proceed to block 335. If, however, a mismatch can be detected, in block 325 the component hosting the required public data can be located and loaded. In decision block 330, if the component hosting the required public data cannot be located in block 390 the installation of the upgraded component or components can be aborted and a failure record can be delivered to an administrative entity, whether manually or in an automated manner.

In block 335, presuming that the required public data will be available to the upgraded component or components, required externally defined methods also can be identified from a review of the machine readable ReadMe file. Once again, the required methods can be identified within the catalog to ensure that the methods will be available to the upgraded component or components. If a mismatch is detected in decision block 345, as before, in block 350, the component hosting the required method can be located and loaded so as to make the method available to the upgraded component or components. In decision block 355, if the hosting component cannot be located and loaded, in block 390, the installation can be aborted and, as before, a failure record can be forwarded to an administrative entity.

In block 360, presuming that the required externally defined methods will be available to the upgraded component or components, those methods implemented within the upgraded component or components which have been modified can be identified. In block 365, the catalog can be reviewed to identify those other components which are dependent upon the methods which have been modified within the upgraded component or components. In decision block 370, if a mismatch is detected, in consequence of a different method signature or prototype, it can be presumed that the API of the application has changed. Consequently, in block 375, an updated version of the dependent component can be located and loaded so as to provide compatibility between the upgraded component or components and the dependent component.

In decision block 380, if an updated version of the dependent component cannot be located and loaded, in block 390 the installation can be aborted and a failure record can be forwarded to an administrative entity. Otherwise, in block 385, the installation of the upgraded component or components can proceed to completion. Importantly, as it will be recognized by one skilled in the art, the process illustrated herein can provide a foundation for the autonomic installation of upgraded application components in a manner so as to both ensure the operability of the upgraded application components, while further assuring that the upgraded application components will not "break" other application components in the system.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An autonomic component installation system comprising:
    a catalog of host components installed within a computing system;
    an autonomic installer coupled to said catalog and programmed to determine, when installing an upgraded component, whether said upgraded component provides component capabilities required by the host components in said catalog.

2. The autonomic component installation system of claim 1, wherein said catalog comprises entries of host components and respective publicly accessible data, method implementations and method prototypes provided by said host components.

3. The autonomic component installation system of claim 2, wherein said autonomic installer comprises an autonomic installer coupled to said catalog to determine when installing an upgraded component whether said upgraded component will have access to required ones of said publicly accessible data and method implementations, and whether modifications included in said upgraded component have caused changes in associated method prototypes which differ from said method prototypes in said catalog.

4. The autonomic component installation system of claim 3, further comprising a machine readable ReadMe file processor coupled to said autonomic installer and configured to identify said required ones of said publicly accessible data and methods implementations.

5. The autonomic component installation system of claim 4, wherein said machine readable ReadMe file is an XML formatted file.

6. The autonomic component installation system of claim 4, further comprising:
    a code analysis engine configured to identify within component code, publicly accessible data utilized by said component code, dependent methods utilized by said component code, and methods and data provided by said component code; and,
    a machine readable ReadMe file production module coupled both to said code analysis engine and also to an integrated development environment configured to create said upgraded component, said production module creating said machine readable ReadMe file based upon said identified publicly accessible data utilized by said component code, dependent methods utilized by said component code, and methods and data provided by said component code.

7. The autonomic component installation system of claim 6, wherein said code analysis engine comprises a byte-code analysis engine.

8. The autonomic component installation system of claim 6, wherein said code analysis engine comprises a source-code analysis engine.

9. A dependency management method comprising the steps of:
    parsing a machine readable ReadMe file associated with an upgraded component to an application to identify both data and method dependencies of said upgraded component, and interface prototype information regarding methods implemented in said upgraded component; and,
    prior to installing said upgraded component, ensuring that said identified data and method dependencies can be accessed by said upgraded component upon installation of said upgraded component, and further ensuring that other components which rely upon said methods implemented in said upgraded component will not be affected by said installation in consequence of changes reflected by said interface prototype information.

10. The method of claim 9, wherein said step of ensuring comprises the steps of:
    determining that at least one of said identified data and method dependencies are missing; and,
    locating and loading said at least one identified data and method dependency so that no one of said identified data and method dependencies remain missing.

11. The method of claim 9, wherein said step of further ensuring comprises the step of further ensuring by reference to a catalog of expected interface prototype information that other components which rely upon said methods implemented in said upgraded component will not be affected by said installation in consequence of changes reflected by said interface prototype information.

12. The method of claim 11, wherein said step of further ensuring comprises the steps of:
   comparing said catalog of expected interface prototype information upon which other components rely to said methods implemented in said upgraded component to detect prototype mismatches; and,
   for each prototype mismatch detected, locating an upgrade to a corresponding one of said other components, and replacing said corresponding one of said other components with said located upgrade.

13. The method of claim 11, further comprising the steps of:
   inspecting all components of said application to identify both required public data and methods, and also prototype information expected by said components for all invoked methods; and,
   storing said identified required public data and methods and prototype information in said catalog.

14. A machine readable storage having stored thereon a computer program for performing dependency management, said computer program comprising a routine set of instructions which when executed cause the machine to perform the steps of:
   parsing a machine readable ReadMe file associated with an upgraded component to an application to identify both data and method dependencies of said upgraded component, and interface prototype information regarding methods implemented in said upgraded component; and,
   prior to installing said upgraded component, ensuring that said identified data and method dependencies can be accessed by said upgraded component upon installation of said upgraded component, and further ensuring that other components which rely upon said methods implemented in said upgraded component will not be affected by said installation in consequence of changes reflected by said interface prototype information.

15. The machine readable storage of claim 14, wherein said step of ensuring comprises the steps of:
   determining that at least one of said identified data and method dependencies are missing; and,
   locating and loading said at least one identified data and method dependency so that no one of said identified data and method dependencies remain missing.

16. The machine readable storage of claim 14, wherein said step of further ensuring comprises the step of further ensuring by reference to a catalog of expected interface prototype information that other components which rely upon said methods implemented in said upgraded component will not be affected by said installation in consequence of changes reflected by said interface prototype information.

17. The machine readable storage of claim 16, wherein said step of further ensuring comprises the steps of:
   comparing said catalog of expected interface prototype information upon which other components rely to said methods implemented in said upgraded component to detect prototype mismatches; and,
   for each prototype mismatch detected, locating an upgrade to a corresponding one of said other components, and replacing said corresponding one of said other components with said located upgrade.

18. The machine readable storage of claim 16, further comprising the steps of:
   inspecting all components of said application to identify both required public data and methods, and also prototype information expected by said components for all invoked methods; and,
   storing said identified required public data and methods and prototype information in said catalog.

* * * * *